M. BOHN.
MACHINE FOR CLEANING AND SORTING CLAY OR THE LIKE.
APPLICATION FILED DEC. 4, 1909.
988,968.
Patented Apr. 11, 1911.
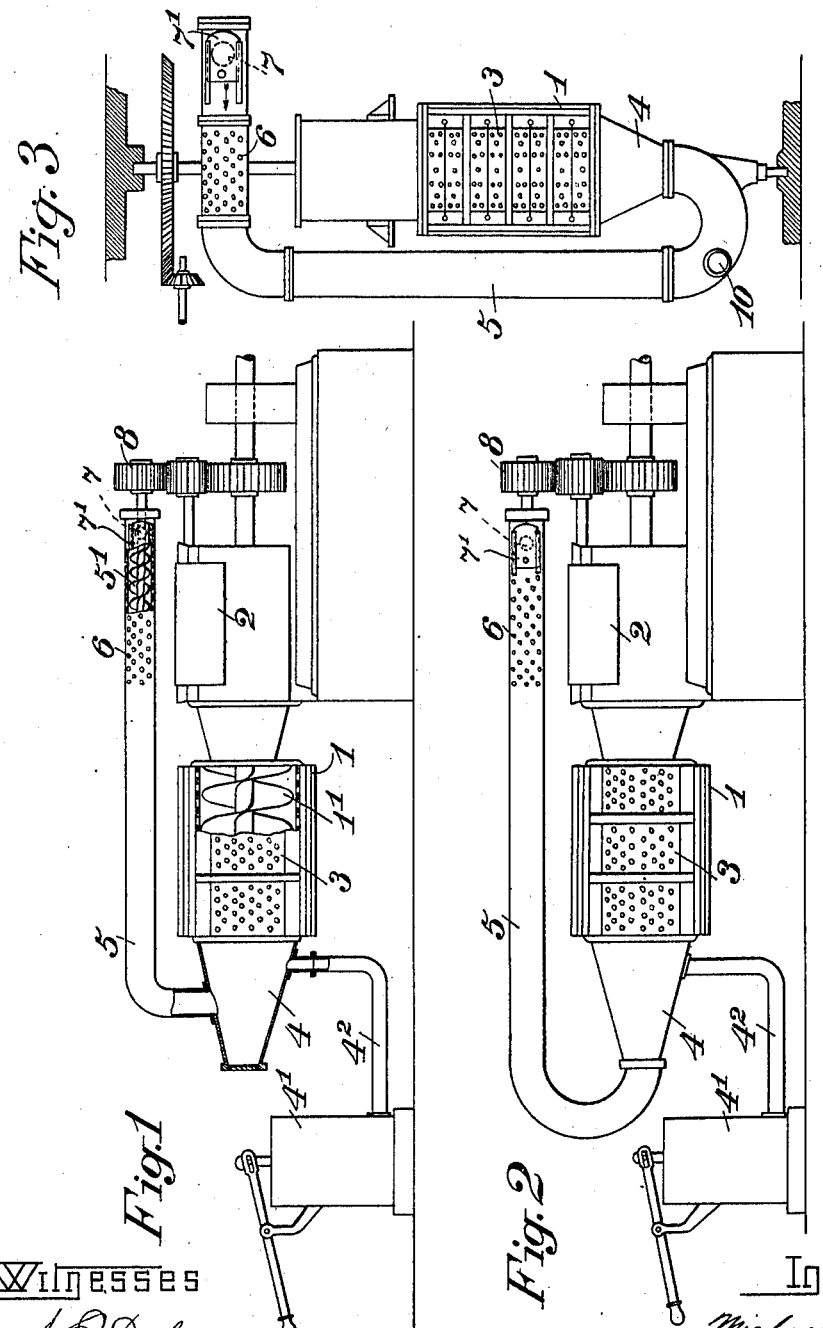

UNITED STATES PATENT OFFICE.

MICHAEL BOHN, OF NAGYKIKINDA, AUSTRIA-HUNGARY.

MACHINE FOR CLEANING AND SORTING CLAY OR THE LIKE.

988,968. Specification of Letters Patent. Patented Apr. 11, 1911.

Application filed December 4, 1909. Serial No. 531,436.

*To all whom it may concern:*

Be it known that I, MICHAEL BOHN, a subject of the King of Hungary, residing at Nagykikinda, Austria-Hungary, have invented certain new and useful Improvements in Machines for Cleaning and Sorting Clay or the Like, of which the following is a specification.

According to this invention a repeated and more perfect purification of the clay is insured by providing a return conduit for the substances separated from the clay. To that end, the substances separated from the clay are not conveyed from the collecting box into the open, but discharged into a return pipe which is provided with perforations or screening holes over the feed device of the clay purifier, and at the end is provided with an opening that can be closed.

Three constructions of the new arrangement are illustrated in the accompanying drawing in which—

Figure 1 is a horizontal and Fig. 2 a vertical clay purifier in side elevation. Fig. 3 another form of the horizontal clay purifier.

Clay is supplied by means of feed rollers 2 to the purifying and sorting cylinder 1 in which is arranged a rotating conveyer. The cylinder is provided with screens 3 of different mesh.

In known clay cleaning machines the substances separated from the clay pass from the cylinder into a collecting chamber which is emptied from time to time. In that process valuable material is lost, since stones etc. separated still contain particles of clay adhering to them. In order to avoid this loss, there is arranged, according to this invention, a closed collecting chamber 4 which is preferably conical, in order to compress together the substances or bodies entering the same. The said collecting chamber is connected with a return pipe 5 which is carried over the feed device 2. The pipe is provided above the feed device with perforations 6, and at the end with an opening 7 which can be opened and closed.

The foreign substances separated from the clay by the purifying conveyer 1' rotating in the cylinder 1, are forced together in the collecting chamber 4 and pass through the pipe 5 to the point 6 where the material is again purified by the screens arranged at that point, and the last particles of clay are separated from the stones etc. The clay falls again into the feed device and leaves the cylinder 1 through the screen 3 corresponding to its nature.

A circulation of the clay in the apparatus is obtained by this arrangement, and this circulation is advantageous inasmuch as the clay fed to the cylinder 1, and which still contains a considerable amount of impurities, is diluted with the clay falling back into the feed device from the pipe 5. The worm is thereby in a way lubricated and protected from wear.

In order to facilitate the purification of the clay and stone mixture compressed in the collecting branch 4, water injection could be arranged. The water is introduced by means of a pump 4', or through a pipe $4^2$ and loosens and moistens the material contained in the collecting box. A rotating conveyer 5' or a scraper could also be arranged in the pipe 5, and would keep the screens 6 always clean and force the clay through the same. The conveyer or the scrapers are driven by means of a gear 8.

In the construction described and shown in Fig. 1 the pipe 5 connects with the conical wall of the collecting chamber 4. Instead of this arrangement, the return pipe 5 could be connected to the collecting chamber in a central manner as shown in Fig. 3.

The opening 7 is used for removing the foreign substances left behind in the pipe 5, and is opened from time to time.

Fig. 2 shows a vertical clay purifier, the principle of which is substantially the same as that described in the foregoing. 10 indicates a cleaning hole, and water injection is arranged at the conical branch 4.

The result of the arrangement according to the present invention is on the one hand, an increase in the yield of clay and on the other hand, that the moving parts of the machine are subjected to smaller wear owing to the clay contained in the machine circulating without interruption and naturally being loosened. In that way, the working is rendered easier, the wear much smaller, and the impurities are separated much more readily.

What I claim as my invention and desire to secure by Letters Patent is:—

1. A clay cleaning and sorting machine, comprising a cylinder, an inlet thereto, a collecting chamber for said cylinder closed on all sides, a return pipe part of which pipe extends above said inlet and is there provided with screen perforations, said pipe connecting with said chamber and having an opening at its end, and means for closing said opening.

2. A clay cleaning and sorting machine, comprising a cylinder, an inlet thereto, a conical collecting chamber for said cylinder closed on all sides, a return pipe connecting with said chamber and part of which pipe extends above said inlet and is there provided with screen perforations, said pipe having an opening at its end, and means for closing said opening.

3. A clay cleaning and sorting machine comprising a cylinder, an inlet thereto, a collecting chamber for said cylinder closed on all sides, a return pipe connecting with said chamber and part of which pipe extends above said inlet and is there provided with screen perforations, said pipe having an opening at its end, means for closing said opening, and means for injecting water into said return pipe.

4. A clay cleaning and sorting machine comprising a cylinder, an inlet thereto, a collecting chamber for said cylinder closed on all sides, a return pipe connecting with said chamber and part of which pipe extends above said inlet and is there provided with screen perforations, said pipe having an opening at its end, means for closing said opening, a conveyer in said return pipe, and means for rotating said conveyer.

In testimony whereof I have signed my name to this specification in the presence of two subscribing witnesses.

MICHAEL BOHN.

Witnesses:
ERNEST MELLER,
JOSEPH WIRKMANN.

---

Copies of this patent may be obtained for five cents each, by addressing the "Commissioner of Patents, Washington, D. C."